United States Patent Office 3,636,225
Patented Jan. 18, 1972

3,636,225
METHOD OF IMPROVING MICROCIRCULATION
Eric T. Fossel, Cambridge, Mass., assignor to Unimed, Inc., Morriston, N.J.
No Drawing. Filed May 1, 1969, Ser. No. 821,111
Int. Cl. A61k 27/00
U.S. Cl. 424—273                                                8 Claims

ABSTRACT OF THE DISCLOSURE

This invention relates to the improving microcirculation and the treatment of conditions which result in impaired microcirculation, according to which invention 4(5)-[2-amino-3-bromo (or chloro) propyl]imidazole or 3-(4-(5)-imidazole) propylene imine (1,2) is administered in order to achieve these results.

BACKGROUND OF THE INVENTION

The microcirculatory or microvascular system is without a doubt the largest "organ" in the body, and if lumped together it would have a bulk twice that of the liver. The average human has a network of 60,000 miles of capillaries of diameter less than 0.3 mm. which compose his microcirculation. It is the microcirculation which is responsible for providing each cell with its nutritional requirements and removing its waste products.

This important system of the body was neither recognized or understood until recent years. With an understanding of the nature of the microcirculation came an awareness that the classic description of the circulatory system as a closed system of pipes connected to a circulating pump was inaccurate. Moreover, it was found that influences which control the macrocirculation have no effect on the microcirculation. In place of the systemic control of the macrocirculation, the microcirculation is under exceedingly local control in each portion of the body.

In recent times more and more emphasis has been placed on microcirculation as a factor in various diseases, among which is included senility.

Apparently, alterations or failure of flow within the microvascular system account for the failure of tissue or organ function in a variety of common clinical conditions. The microcirculation may be comprised by either arterial occlusions or venous occlusions. In both cases the capillary network immediately ahead or behind the plug will be blocked. Vast numbers of capillary vessels may be obstructed to involve almost an entire organ, and yet central or large vessel flow may give no indication of this.

Since the specific and non-specific functions of all cells depend on proper nutrition and elimination of undesirable metabolites, impairment of the blood supply as a result of impaired microcirculation could affect cells directly.

Attempts have been made to use histamine to overcome impaired microcirculation, however, histamine can only be administered by injection, and in addition, the dosages of histamine must be very carefully regulated because overdosages thereof are highly toxic and could even be fatal.

More recently, as described in U.S. Pat. No. 3,439,096, beta-(2-pyridyl-lower alkyl)-amines have been administered with excellent results.

SUMMARY OF THE INVENTION

Generally speaking, in accordance with the present invention, impaired microcirculation is improved by the administration to a subject requiring the same of a microcirculation-improving effective amount of at least one compound selected from the group consisting of 4(5)-[2-amino-3-bromopropyl] imidazole, 4(5)-[2-amino-3-chloropropyl] imidazole and 3-(4(5)-imidazole) propylene imine (1,2), and non-toxic acid addition salts thereof.

It is accordingly a primary object of the present invention to provide for new substances which can be used for the treatment of impaired microcirculation, which substances can be used by any mode of administration, e.g. oral, intravenous, intramuscular, etc.

It is yet another object of the present invention to provide a method of treating senility.

It is still a further object of the present invention to provide a method of improving impaired microcirculation with a minimum of toxic dangers due to over-dosages.

Other objects and advantages of the present invention will be apparent from a further reading of the specification and of the appended claims.

The administration of the above compounds, by any common mode of administration, including orally or by injection, provides highly effective results improving impaired microcirculation and in the treatment of senility.

The 3-(4(5)-imidazole) propylene imine (1,2) may be administered in amounts as low as 0.5 mg. per day and as high as 45–50 mg. per day to achieve the effects of the present invention. This compound is preferably administered in an amount of about 4–45 mg. per day, or preferably in an amount of about 12–45 mg. per day, and most preferably in a unit dose of about 4–15 mg. administered three times a day.

The 4(5)-[2-amino-3-bromopropyl] imidazole and the 4(5)-[2-amino-3-chloropropyl] imidazole are generally administered in about double the dosage of the 3-(4(5)-imidazole) propylene imine (1,2), that is in amounts of 1–100 mg. per day, preferably about 10–90 mg. per day, or more preferably about 25–90 mg. per day, using unit dosages of about 10–30 mg. administered three times a day.

The above compounds may be administered as such or in the form of their non-toxic acid addition salts, such as the hydrochloride.

DESCRIPTION OF PREFERRED EMBODIMENTS

The following examples are given to further illustrate the present invention. The scope of the invention is not, however, meant to be limited to the specific details of the examples.

EXAMPLE 1

Tablets are prepared by usual tabletting procedure, each tablet containing:

3-(4(5)-imidazole) propylene imine (1,2)—5 mg.
Calcium carbonate, q.s.—1 g.

The above tablet can be administered in all conditions requiring improved microcirculation. The tablet is thus effective in the treatment of senility.

EXAMPLE 2

Tablets are prepared by usual tabletting procedure, each tablet containing:

4(5)-[2-amino-3-bromopropyl] imidazole—15 mg.
Lactose, q.s.—1 g.

This tablet is highly effective in improving impaired microcirculation and in the treatment of senility.

EXAMPLE 3

Ampules are prepared, each containing 10 cc. and each cc. consisting of 10 mg. of 4(5)-[2-amino-3-bromopropyl] imidazole hydrochloride dissolved in 0.9% sodium chloride solution. This solution can be administered parenterally to improve impaired microcirculation in the treatment of senility.

It is apparent from the foregoing that adaptations and variations of the invention can be made without departing from the spirit or scope thereof, and such adaptations and variations are meant to be comprehended within the meaning and scope of equivalents of the present invention.

What is claimed is:

1. Method of improving impaired microcirculation, which comprises administering to a subject requiring the same a microcirculation-improving effective amount of a substance selected from the group consisting of 4(5)-[2-amino-3-bromopropyl]imidazole, 4(5)-[2-amino-3-chloropropyl] imidazole, 3-(4(5)-imidazole) propylene imine (1,2) and non-toxic acid addition salts thereof.

2. Method according to claim 1 wherein said substance is 4(5)-[2-amino-3-bromopropyl] imidazole.

3. Method according to claim 1 wherein said substance is 4(5)-[2-amino-3-chloropropyl] imidazole.

4. Method according to claim 1 wherein said substance is 3-(4(5)-imidazole) propylene imine (1,2).

5. Method according to claim 1 wherein the mode of administration is oral.

6. Method according to claim 2 wherein said substance is administered in an amount of about 1–100 mg. per day.

7. Method according to claim 3 wherein said substance is administered in an amount of about 1–100 mg. per day.

8. Method according to claim 4 wherein said substance is administered in an amount of about 0.5–50 mg. per day.

References Cited

UNITED STATES PATENTS 2,677,692   5/1954   Schneider _____ 260—309

OTHER REFERENCES

Journal of the American Chemical Society (JACS), 90:2, Jan. 17, 1968, (1) pp. 363–366, (2) pp. 367–371.

ALBERT T. MEYERS, Primary Examiner

N. A. DREZIN, Assistant Examiner